_United States Patent Office_

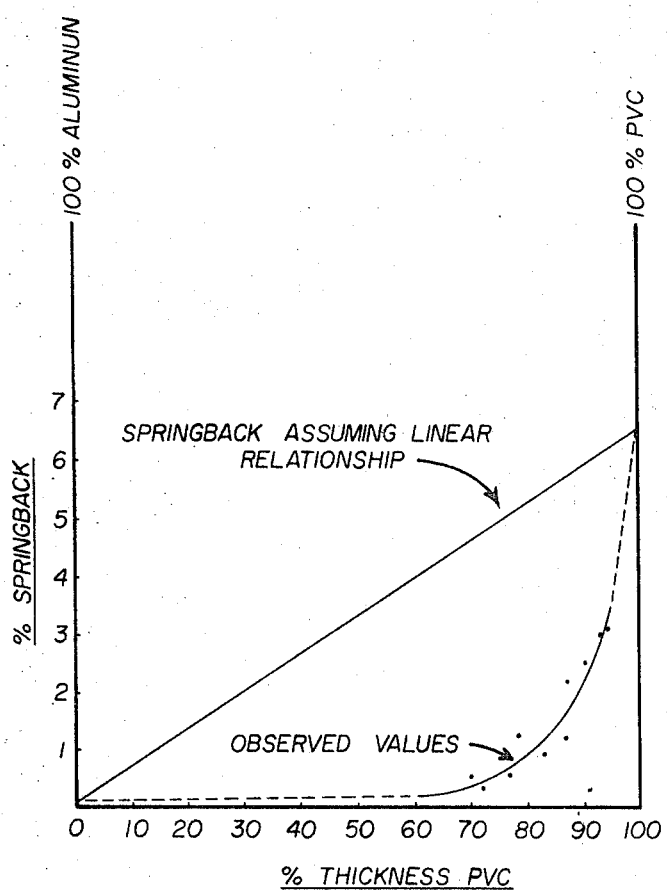

3,578,552
Patented May 11, 1971

3,578,552
THERMOSETTING LAMINATES
Dusan C. Prevorsek, Morristown, Hsin L. Li, Parsippany, Paul J. Koch, Mount Freedom, Hendrikus J. Oswald, Morristown, and George J. Schmitt, Madison, N.J., assignors to Allied Chemical Corporation, New York, N.Y.
Continuation-in-part of application Ser. No. 604,255, Dec. 23, 1966. This application Apr. 4, 1968, Ser. No. 718,858
Int. Cl. B32b *15/08, 27/36, 27/40*
U.S. Cl. 161—214
9 Claims

ABSTRACT OF THE DISCLOSURE

A cold formable sandwich structure which has a thermosetting resinous core between face sheets comprising laminae of a thermoplastic sheet which incorporates a metallic foil. The metal foil-thermoplastic resin facing sheets are of sufficient thickness and strength so that the sandwich containing the thermosetting core between the face sheets may be cold-formed into shaped articles and such shape as is imparted to it is retained by the thermoplastic face sheets without external constraint on the shape as the thermosetting core is subsequently cured at relatively high temperatures.

---

This is a continuation-in-part application of U.S. patent application Ser. No. 604,255 filed on Dec. 23, 1966, now Pat. 3,520,750. This invention relates to the forming of shaped articles comprising synthetic thermosetting resins. More particularly, the invention relates to the provision of a structure comprising a thermosettable plastic lamina which is sandwiched between surface laminae consisting essentially of metal foil in combination with thermoplastic layers or enclosing face sheets to form a composite which may be cold-formed into suitable shapes and thereafter cured at relatively high temperatures without being constrained and without substantial springback.

While the relatively fast techniques which are normally applied in metal forming have been utilized, in shaping thermoplastic resin blanks or sheets these approaches when applied in connection with thermosettable composition have been essentially impractical. The inability to utilize these techniques is largely due to the fact that thermosettable compositions lack the necessary physical characteristics, e.g. generally before curing, they do not possess the necessary strength, draw characteristics, integrity to retain desired shape imparted thereto, etc. Accordingly, thermoset shapes have heretofore required considerable time in the mold to allow setting at least to the extent of achieving permanency of shape. This is evidenced by the normal techniques now employed which require confining a thermosettable plastic shape for considerable periods of time and a heated mold of the desired shape until sufficient curing of the thermosettable composition has occurred to prevent the composition from altering the molded shape after external constraint on the composition has been removed.

In copending parent application Ser. No. 604,255 filed on December 23, 1966, entitled Novel Thermosetting Composites and Process for Making, of which this is a continuation-in-part, formable laminates of thermosettable resin sandwiched between thermoplastic resin layers are disclosed. The present invention involves essentially the improvement comprising using face sheets over the thermosettable core of a thermoplastic layer in combination with a metal barrier foil which with a given thermoplastic permits the use of relatively high temperatures without resulting springback.

During a deep drawing shaping process of plastic sheet stock executed at ambient temperatures, the materials undergo severe straining and stressing. Thus it is not surprising that relatively few thermoplastic polymers are considered at present as potential candidates for processing by this technique. In order to perform satisfactorily in a cold forming operation, in curing, and in subsequent end use application, the thermoplastic material must (1) have sufficient ductility and strength to overcome, without rupturing, buckling, necking, etc., the stresses and strains imposed on the sheets during the forming into the desired shapes, (2) retain as much as possible the imposed shape when taken from the mold or die, and (3) retain its shape at practical curing temperatures and (4) at temperatures of end use applications.

Many polymers such as polystyrene, polyacrylics, etc. are not suitable unless properly modified for cold forming operations because they are too brittle and fracture during the shaping into relatively simple shapes. Polyethylene, polypropylene, nylon 6 and nylon 66 etc. on the other hand can be shaped relatively easy into deep shapes at ambient temperatures; nevertheless, these materials cannot be used efficiently in a cold forming process because of poor retention of the imposed shape after the removal from the die. Generally, materials that have the glass transition temperature below the temperature of forming would usually spring back after release from the mold to a degree where this distortion cannot be economically and practically taken into account by the appropriate design of the mold.

Polymers such as polyvinylchloride, ABS[1], cellulose acetate butyrate, chlorinated polyvinylchloride, etc. can be cold formed and also retain well the imposed shape after the release from the mold. Unfortunately, items prepared from these polymers in a cold forming process undergo severe distortion at moderately elevated temperatures. The heat distortion temperature of cold formed items lies very close to the glass transition (Tg) temperature of the polymer. Thus, it is easily understood why so much effort in cold forming has been devoted to the exploration of the potential of high glass transition polymers such as polycarbonate, polysulfones, sulfone polyesters, etc. Most of these high Tg polymers can indeed be cold formed with a relatively small "spring-back" and also they retain the shape well, e.g. above the temperature of boiling water. However, experience with these materials has been generally unsatisfactory for a number of reasons, e.g. because of stress cracking, relatively high cost, greater difficulty in handling, etc., which greatly restricts the applicability of these otherwise very attractive materials. The problem of stress cracking is particularly critical when these materials are used as face sheets with our thermosettable lamina. In this case the face sheets are in contact with active components of the core during storage and shipment of the assembled laminate. Consequently, the face sheets of these laminates in addition to the characteristics discussed above must have also: (1) resistance to stress and environmental cracking when in contact with the thermosetting core, (2) low permeability to volatiles in the core and, (3) a surface which can be bonded securely to the core during the curing process.

Therefore, it is not surprising that to date a satisfactory general purpose thermoplastic-thermoset cold formable laminate has not yet been developed, i.e. the structures proposed heretofore offer at the most a suitable compromise for narrow ranges of uses. We have found that the above-discussed problems encountered with cold-formable thermosetting composites can be solved in an efficient, reliable and economical way by using a metal-thermoplastic combination laminate instead of a thermoplastic layer as ---
[1] Acrylonitrile-butadiene-styrene polymers.

the face sheets. The metal foil functions as: (1) reinforcement, (2) barrier; it provides also (3) a high energy surface favorable for bonding; (4) reduces the "spring-back" on removing the shaped item from the mold; and (5) increases the heat distortion temperature of the laminate. The latter two advantages are particularly favorable.

The thermoplastic layer, on the other hand, provides (1) a surface that does not require before usage costly finishing and painting operations, (2) a good abrasion and chemical resistance, (3) excellent thermal and electrical insulating characteristics, and (4) soft and warm feel, and other typical advantageous characteristics of plastics.

The structures described by the present invention have a wide breadth of utility; the sandwich assembly may be employed in fabricating a variety of components such as vehicle fenders or bodies, housings, etc. additionally, for example metallic foil in the sandwich assembly may serve as an electrical ground and eliminate the costly conventional process of electroplating, or aluminum coating on the polymeric material in applications where such conditions are required (e.g. in fairing sections of aircraft).

It is an object of this invention to provide a novel cold-formable laminate consisting of a cross-linkable core sandwiched between two metal-thermoplastic laminae which eliminate the disadvantage inherent in similar laminates where the face sheets are of a thermoplastic material.

It is a further object of this invention to eliminate the disadvantages inherent in cold formable metal-thermosetting laminates.

It is still a further and important object of this invention to take advantage of the unexpected characteristics, e.g. relatively low spring back, of such metal-thermoplastic-thermoset structure.

It is another object of the invention to provide a thermosettable composite which may readily be converted to desired shapes at ambient temperatures characterized by a thermosettable layer sandwiched between thermoplastic layers in combination with metal foil laminae which are of sufficient strength to permit the desired shape imparted to the composite to be retained as the thermosettable layer is converted to the thermoset condition using relatively high curing temperatures without requiring external constraint.

It is still another object of the invention to provide a composite laminate having a relatively high heat distortion temperature comprising a core of thermosetting composition and face sheets of thermoplastic composition in combination with a metal foil barrier which is capable of being cold-formed, i.e. at ambient temperatures into useful shapes in an expeditious manner.

Additional objects and advantages of the present invention will be apparent from the following description taken in conjunction with the accompanying drawing wherein the diagram in the figure depicts the disproportionate reduction in spring back obtainable relative to the thickness ratio of metal foil in the facing lamina.

Cold formed materials have a tendency to change shape on removal from the die. This phenomenon which will hereafter be referred to as "spring back" is due to the presence of stresses introduced in the item during the cold-forming operation. Those skilled in the art will recognize that we are at this point concerned with the phenomenon of elastic "memory" which tends to bring back a polymeric cold shaped item into its original form as soon as the constraining forces are removed. In cases where this "memory" is very strong one can usually follow the returning of the shaped item to its original configuration namely into a flat sheet. All materials including cold formable metals exhibit some "spring back" which must of course be properly accounted by the die-design to achieve a desired shape. It is obvious that an excessive "spring back" is highly undesirable since it requires a complicated die-design and furthermore it reduces the flexibility in the choice of shapes which can be obtained by a cold forming process and affects the dimensional consistency of the formed articles.

Thermoplastic material, and especially those having the glass transition temperature below the temperature of forming, exhibit considerable "spring-back" from the imposed shape when the item is taken from the mold (die). One would expect that a laminate consisting of a material with a high "spring-back" and of a material with a low "spring-back" would exhibit an intermediate "spring-back." We have found unexpectedly that "spring-back" of the laminate approaches much closer to the "spring-back" of the material with low elastic memory (low "spring-back") than expected on the basis of a linear rule. For example, it is possible to use a very thin metallic layer laminated to a thermoplastic sheet and obtain a structure with greatly reduced "spring-back."

The same unexpected effect obtained by laminating a thermoplastic and a metallic layer is observed when the heat distortion temperature of the laminate is the consideration. We found that a very thin layer of aluminum (e.g., 0.001") laminated to a 10 mil PVC sheet increases the heat distortion temperature of the latter from 60° C. to ~150° C. "Heat distortion temperature" as the term as used herein refers to the temperature at which a cold formed item changes one of its linear dimensions more than 5%.

Shaping and curing of the composite of the present invention may be effected in the manner and by apparatus such as that described in the herein-above referred to application Ser. No. 604,255.

In preparing sandwich structure, it is important that the composition of the core and the core-outer walls thickness ratio be such that the composite laminate has before curing both sufficient ductility to be shaped at essentially ambient temperatures and sufficient rigidity to allow the execution of various consecutive shaping and finishing operations without requiring, i.e. employing an external constraining means such as a mold in which to retain the shape after forming and until curing has been effected. The outer layer of the composite, accordingly, has a multiple function: (a) to provide the desired surface properties and characteristics; (b) to represent an essential structural element contributing to the strength and ductility required for shaping, functioning thus in a sense as faces of a matching die set and to continue this function during the curing step until the core is converted into a rigid network; at this state the outer walls become an intergral part of the structure bonded securely to the rigid core. Thus, in the final state, the core reinforces the walls and effectively contributes to their dimensional stability at elevated temperatures under load.

In forming the laminate contemplated by the invention, any of a variety of one or more of the known thermosettable resinous compositions may be employed to form the core layer of the composite. For example, polyesters, substituted polyesters, e.g. chlorinated polyesters, phenolics, polyurethanes, melamines, epoxies, ureas, silicones, and the like may be used. These resins can be modified, for example, by admixing therewith various ingredients, e.g. thermoplastic polymers such as polyvinyl chloride, polyethylene, polystyrene, and the like. Also, they may contain fillers, reinforcing agents, thixotropic agents and the like and they can be prepolymerized or prethickened by some other means to the desired viscosity. Preferably, the core compositions contain epoxy, polyester or polyurethane resins.

Epoxy compounds included in the compositions of the present invention may be any of the known epoxy compounds which contain a plurality of epoxy groups of the structure

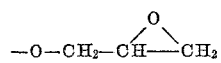

Typical examples of such epoxy compounds include polyglycidyl esters of polybasic acids as disclosed in U.S.

Pat. No. 2,866,767; polyglycidyl ethers of polyhydric phenols as disclosed in U.S. Pat. Nos. 2,467,171; 2,506,486; 2,640,037 and 2,841,595 and polyglycidyl ethers of polyhydric alcohols as disclosed in U.S. Pat. Nos. 2,598,072 and 2,581,464.

Curable polyester resins contemplated for the thermosetting core of the invention may be any of the known compositions which contain a polymeric (a) and a monomeric component (b), i.e. one or more ethylenically unsaturated, polymerizable polyesters, polymers which contain, combined by ester linkages, radicals of one or more polybasic, particularly dibasic carboxylic acids and radicals of one or more polyhydric alcohols, particularly dihydric alcohols. Optionally, additional radicals of one or more of the following may be incorporated: monobasic carboxylic acids, one or more monohydric alcohols and one or more hydroxy carboxylic acids, at least some of said radicals having ethylenically unsaturated polymerizable groups and one or more monomeric, ethylenically unsaturated, polymerizable compound. Typical resin compositions of this kind are disclosed in U.S. Pat. Nos. 2,225,313 and 2,667,430, for example. Modified resins of this kind are also disclosed, for example, in U.S. Pat. Nos. 2,628,209; 3,219,604 and the like.

Curable polyurethane resins included in the compositions of the invention may be any known products obtained by the reaction of polyesters of polyethers with diisocyanates. Typical examples of such resins are disclosed, for example, in U.S. Pat. Nos. 2,721,811; 2,620,-516; 3,061,497 and 3,105,062.

For achieving optimum properties in the final article and optimum ability to shape at ambient temperature, it is important that the resin composition of the core have a sufficiently high viscosity to prevent an excessive squeezing out of the core material during the shaping step in the press or mold and enough fluidity to wet the surface of the face sheets with which it is required to obtain bonding. We have found that for laminates having a core to skin thickness ratio in the range from 1:2 to 6:1, resin compositions having viscosities in the range from 200,000 to 20,000,000 poises usually fulfills these requirements. It should, however, be pointed out that with thin laminates and moderately deep articles, the viscosity can further be reduced while with articles with which the bonding between the outer sheets and the core is not critical (e.g. because it is provided by some mechanical means) cores containing higher viscosity resin compositions can be used. The core compositions can be filled and/or reinforced, they may also contain pigments, thixotropic agents, impact modifiers, etc. There are several ways to achieve and/or control the viscosity of the resin composition in the core. For example, with polyester resins, the viscosity of the resin composition can be increased by increasing the molecular weight of the base resin and/or by changing the composition of the base resin or by partial or complete substitution of styrene with some other monomers such as acrylamide, diallylphthalate, calcium acrylate, etc.

For economic purposes and/or to reduce the shrinkage of the resin during curing, it is sometimes advantageous to use fillers such as clay, asbestos, barytes, ground silica, magnesium carbonate, diatomaceous earth, etc. to increase the consistency of the resin composition. When high performance articles are the consideration, it might be advantageous to use polyester resins modified with metal oxides, hydroxides or alkoxides (as in U.S. Pat. No. 3,219,604). For example, the addition of magnesium oxide to the polyester resin results in a remarkable increase in the viscosity in comparison to a comparable unmodified polyester copolymerizable monomer composition containing the same percentage of copolymerizable monomer. In addition, the thickening effect of magnesium oxide can be controlled so that the viscosity increase takes place gradually over a period of several hours, thus assisting in the deposition of the resin applied to a glass mat in a very fluid state. In such cases a dip coating technique may be used while the subsequent thickening of the resin to the desired viscosity takes place when the core is sandwiched between two thermoplastic-metal laminae. In the process good wetting of glass and face sheets is obtained which is required to obtain maximum mechanical properties and good adhesion.

Suitable thermoplastic materials which may be employed for face sheets laminae comprise a wide range of polymeric compositions.

Included, for example, are olefinic polymers such as polyethylene, polypropylene, and copolymers and terpolymers thereof, e.g. copolymers of ethylene and ethyl acrylate, vinyl polymers comprising one or more of the following monomers: vinyl aryls such as styrene, O-phenylstyrene, m-phenylstyrene, p-phenylstyrene, O-methylstyrene, m-methylstyrene, p-methylstyrene, o-methoxystyrene, m-methoxystyrene, p-methoxystyrene, o-nitrostyrene, m-nitrostyrene, p-nitrostyrene, and the like; vinyl and vinylidene halides, such as vinyl chloride, vinylidene chloride, vinylidene bromide, and the like; vinylesters such as vinyl acetate, vinyl propionate, vinyl butyrate, vinyl chloroacetate, vinyl benzoate, and the like; polycarbonates, that is, thermoplastics containing the following repeating unit:

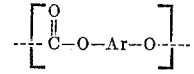

wherein Ar is the residue of an aromatic dihydric phenol; cellulosics such as cellulose acetate, cellulose triacetate, cellulose acetate butyrate, cellulose propionate, ethyl cellulose, and the like; polyamides such as nylon 66, nylon 6, nylon 610, poly-m-xylylene, adipamide, polyhexamethylene terephthalamide, and the like; polyesters such as polyethylene terephthalate, polyethylene isophthalate, poly(ethylene - 2,7 - naphthamate), poly(ethylene-p,p'-diphenylate), various copolymers thereof, and the like; chlorinated polyethylene, chlorinated polyvinyl chloride, polyfluorocarbons such as polytetrafluoroethylene, polytrifluorochloroethylene, polyhexafluoropropylene and various copolymers and terpolymers thereof, as for example, copolymers of vinylidene fluoride and trifluorochloroethylene, and the like. Among the thermoplastic resins which are found to impart preferred results are: polycarbonates, polyvinyl, chloride, polysulfones, cellulose acetate butyrate, chlorinated polyvinyl chloride and chlorinated polyethylene.

In the shaping of deep articles, particularly in deep drawn articles, below, it is advantageous to use polymers which are impact modified. This is true regardless of whether the consideration is the shaping of thermoplastic-metal laminae per se or in combination with suitable cross-linkable core compositions. With impact modified sheets, it is possible to obtain both deeper draws in a single step or faster closing cycles of the press or mold, which results in a higher production rate and thus, better economy.

In addition to known chemical impact modifiers, it is also possible to achieve considerable improvement in the performance of a given polymeric sheet stock in the press by treating the sheets mechanically. It has been recognized by prior art that deep drawing at ambient temperatures can be greatly facilitated if the thermoplastic sheets are either cold or hot rolled or cold or hot biaxially stretched before shaping. In addition to the before-mentioned improvement in the draw ratio and shaping cycle, such mechanical treatment also effects improvement in the uniformity of the thickness of the shaped article.

The foil or sheet may comprise a variety of metals such as aluminum, tin, copper, silver, gold, magnesium, steel and the like and various alloys thereof. In general where the predominant characteristics of plastic surface are the primary concern, metal foils of from less than 1 mil may be used. Thicknesses of metal foil to as much as 100 mils or more may be employed. The metal to plastic thickness ratio of the face sheets may vary from about 0.01 to about 10.

The following examples illustrate the invention in greater detail. Parts recited are parts by weight unless expressly stated otherwise.

EXAMPLE I

This example illustrates the preparation of articles shaped at room temperature from a sandwich consisting of a reinforced epoxy resin interposed between two laminated face sheets. The laminated face sheets were prepared by bonding aluminum foil to polyvinyl chloride. The following composition is suitable for shaping by the below-described technique:

Polyvinyl chloride [2] (each of two sheets 0.010" thick)

Aluminum foil [3] (each of two sheets 0.003" thick)

Fiber glass reinforced epoxy resin core compound of the following composition:

|   | Parts/wgt. |
|---|---|
| 1. General purpose bis-phenyl A type epoxy resin (Epon 828 Shell Chemical Co.) | 20 |
| 2. Curing agent (Curing Agent Shell Chemical Co.) | 2.2 |
| 3. Calcium carbonate—particle size 0.06 micron (Multifex-Diamond Alkali Co.) | 22 |
| 4. Calcium carbonate—particle size 0.2 micron (Suspenso-Diamond Alkali Co.) | 42 |
| 5. Chopped fiber glass—¼" (No. 832 Owens-Corning) | 11 |
| 6. Aluminum Palmitate (Qutco Chemical Co.) | 1.2 |

The above-described core compound was prepared in a sigma blade mixer until a homogeneous putty was obtained. The polyvinyl chloride-aluminum foil laminates were prepared by adhesive bonding under heat and pressure. The sandwich assembly, whose total thickness was 0.110", was constructed so that the aluminum foil faced the core. A 7½" diameter circular blank was cut from this assembly and shaped, using a hydraulic press and triple action, deep drawing die set, into a 5" diameter flat bottomed cup whose wall height was 1.5". The die set works as follows: first, the blank-holder applies a preset pressure to the flange of the blank, then the punch draws the blank from under the blank-holder into the die to shape the cup. Finally, the knock-out pushes the cup from the die as the punch and blank-holder return to their starting position.

The shaped assembly was removed from the press, placed in an air circulating oven and allowed to cure at 93° C. for two hours. The cured cup was then exposed an additional hour at 150° C. with no observable distortion.

An all polyvinyl chloride cup, and a similar sandwich assembly using all polyvinyl face sheets had a heat distortion temperature of 70° C.

EXAMPLE II

The procedure of Example I was generally repeated using the epoxy core composition described. However, instead of polyvinyl chloride-aluminum laminates as face sheets, there separate runs using face sheets (a), (b) and (c), described below were substituted.

Run (a) used laminated face sheets of 0.010" thick polyethylene and 0.003" thick aluminum foil, run (b) used 0.010" thick polypropylene and 0.003" thick aluminum foil and run (c) used 0.010" thick nylon 6 and 0.003" thick aluminum foil. The laminated sheets, as described, were assembled into a composite sandwich with the epoxy putty core. Articles shaped from these composites by the previously described technique, were cured at 93° C. for two hours and further exposed an additional hour at 150° C. with no observable distortion.

EXAMPLE III

This example illustrates the preparation of shaped articles from a sandwich assembly consisting of a layer of reinforced polyester resin interposed between two laminated face sheets. The face sheets were prepared by bonding aluminum foil to polycarbonate. The following composition is suitable for shaping by the previously described technique.

Polycarbonate [4] (two sheets of 0.020" thick each)

Aluminum foil (two sheets of 0.003" thick each)

A layer of non-woven glass fiber cloth impregnated with a polyester resin composition having a viscosity of about 800,000 centipoises (amount of glass~25% by weight) [5] comprises the core.

The sandwich assembly was constructed so that the aluminum foil faced the core. A 7½" diameter circular blank was cut from this assembly and shaped into a 5" diameter flat bottomed cup whose wall height was 1.5".

The shaped assembly was removed from the press, placed in an air circulating oven and allowed to cure at 100° C. for 1 hour, then 150° C. for an additional hour. There was no evidence of stress cracking in the polycarbonate portion of the face sheets.

When a similar sandwich assembly, using all polycarbonate face sheets, was shaped and cured, the polycarbonate became severely stress cracked.

EXAMPLE IV

The procedure of Example III was generally repeated using the polyester core composition described. However, instead of polycarbonate-aluminum laminates as face sheets, polysulfone [6] (0.020" thick)-aluminum foil (0.003" thick) laminates were substituted. After shaping and curing there was no evidence of stress cracking in the polysulfone portion of the face sheets.

When a similar sandwich assembly, using all polysulfone face sheets, was shaped and cured, the polysulfone became severely stress cracked.

EXAMPLE V

This example illustrates the importance of using the combination of polyvinyl chloride and metal foil in the face sheets laminate. The structure is assembled into a composite sandwich with an epoxy putty core. This sandwich can be shaped into an article at room temperature and cured at elevated temperature outside the shaping apparatus. The disadvantage of using polyvinyl chloride alone or aluminum foil alone as face sheets is illustrated as follows:

(a) A cup was formed, using the composition and technique as described in Example I, with the exception that only polyvinyl chloride and no aluminum foil was used in the face sheet. This cup was placed in an air circulation oven and allowed to cure at 150° C. for ½ hour. The polyvinyl chloride face sheets completely delaminated from the core.

(b) The experiment was repeated as illustrated above except that aluminum foil [7] (each of two sheets 0.003" thick) was used as face sheets in place of polyvinyl chloride. Excessive wrinkling and buckling of the aluminum foil along the radial direction and severe rupture along circumferential direction of the cup were observed.

(c) In a third run face sheets of aluminum foil (0.003" thick) bonded to polyvinyl chloride sheet (0.010") under

---

[2] Commercially available as PVC–US1002 BT from American Hoechst Corporation.
[3] Commercially available as 1145-0 from Aluminum Corporation of America.
[4] Commercially available as Lexan polycarbonate from General Electric Company.
[5] Commercially available Allied Chemical Corporation polyester resin sold under the trademark Plaskon 750 can also be used.
[6] Commercially available as Polysulfone 3500 from Union Carbide Corp.
[7] Commercially available as 1145-0 from Aluminum Corporation of America.

heat and pressure were employed. Excellent cups were formed using the same procedure described previously. The cup was placed in an oven at 150° C. for ½ hour; no delamination was observed.

EXAMPLE VI

This example illustrates the unexpected finding that springback, that is the percent dimensional change from the imposed dimension, does not follow a linear rule between high and low springback materials, but that the springback of a laminate approaches much closer to that of the material with the low springback.

Face sheet laminates of polyvinyl chloride and aluminum foil were prepared over a range of polyvinyl chloride thicknesses (.005' to .020") and aluminum thicknesses (.001" to .010"). Composite cups were produced with these laminates as face sheets, by techniques described in Example I, and their sprinkback, expressed as percent increase in the inner diameter of the cup from that imposed by the punch, were measured.

On the basis of a linear relationship, one could expect, for example, that a laminate of .010" polyvinyl chloride and .003" aluminum would have a springback of 5%, however, a much lower value of 0.6% was actually observed. Additional values of measured springback and calculated values assuming a linear relationship between springback of the laminate and its composition are given in the figure of the drawing and Table I. The overriding influence of the low springback material extends well into the region where the thickness of the metal-thermoplastic laminate consists of 90% or more of the thermoplastic component.

It will be appreciated by those skilled in the art that analogous behavior will result where heat distortion expressed as percent change in dimension at elevated temperature is the consideration.

TABLE I

| Polyvinyl chloride, thickness in inches | Aluminum, thickness in inches | Polyvinyl chloride, percent | Springback, calculated percent | Springback, observed percent |
|---|---|---|---|---|
| .005 | .003 | 62 | 4.1 | 0.21 |
| .005 | .002 | 72 | 4.8 | 0.31 |
| .007 | .003 | 70 | 4.6 | 0.52 |
| .007 | .002 | 78 | 5.1 | 1.25 |
| .007 | .001 | 87 | 5.7 | 2.2 |
| .010 | .003 | 77 | 5.0 | 0.63 |
| .010 | .002 | 83 | 5.4 | 0.89 |
| .010 | .001 | 91 | 6.0 | 2.5 |
| .014 | .002 | 87 | 5.7 | 1.2 |
| .014 | .001 | 93 | 6.1 | 3.0 |
| .015 | .001 | 94 | 6.2 | 3.1 |
| .020 | ---- | 100 | ---- | 6.5 |
| ---- | .010 | 0 | ---- | 0.1 |

We claim:
1. A laminate which may be formed while uncured into shaped articles comprising: (A) a core layer of substantially uncured thermosetting resinous composition said layer being of itself insufficiently cured to retain a shape which is imparted thereto and on each face and sandwiching said core layer, (B) a layer consisting essentially of (1) a metal foil in combination with (2) a thermoplastic resin layer, said metal foil being disposed between the core layer and the thermoplastic, said thermoplastic layers being of sufficient strength to permit the desired shape imparted to the laminate to be retained and the thermosetting resin core to be cured to a thermoset condition without external constraint on said laminate.
2. The laminate of claim 1 wherein the thermoplastic layers comprise polyvinylchloride bonded to an aluminum foil.
3. The laminate of claim 1 wherein the thermoplastic layers are polyethylene bonded to an aluminum foil.
4. The laminate of claim 1 wherein the thermoplastic layers are polypropylene bonded to an aluminum foil.
5. The laminate of claim 1 wherein the thermoplastic layers are nylon 6.
6. The laminate of claim 1 wherein the thermoplastic layers are nylon 66.
7. The laminate of claim 1 wherein the thermoplastic layers are polyvinyl chloride bonded to steel foil.
8. The laminate of claim 1 wherein the thermoplastic layers are polyethylene bonded to steel foil.
9. The laminate of claim 1 wherein the thermoplastic layers are polypropylene bonded to steel foil.

References Cited

UNITED STATES PATENTS

| 2,872,366 | 3/1959 | Kiernan | 161—218X |
| 3,176,685 | 3/1963 | Smarook | 161—216X |
| 3,288,664 | 11/1966 | Hoppe | 161—214X |
| 3,290,208 | 12/1966 | Lewis | 161—170 |
| 3,361,845 | 2/1968 | Watanebe | 260—865X |
| 3,382,136 | 5/1968 | Bugel | 161—165 |
| 1,921,164 | 8/1933 | Lewis | 20—91 |
| 3,131,116 | 4/1964 | Pounds | 161—258 |
| 3,382,136 | 5/1968 | Bugel et al. | 161—165 |

JOHN T. GOOLKASIAN, Primary Examiner

L. T. KENDELL, Assistant Examiner

U.S. Cl. X.R.

156—222; 161—183, 184, 186, 190, 215, 216, 218; 264—241